United States Patent
Durand et al.

(10) Patent No.: US 6,660,778 B1
(45) Date of Patent: Dec. 9, 2003

(54) METHOD FOR EMULSIFYING HEAT-SENSITIVE SILICONES EMULSION WITHOUT GRINDING

(75) Inventors: Nicolas Durand, Lyons (FR); Hervé Maze, Lyons (FR); Jean-Michel Mercier, Thiais (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 10/069,659

(22) PCT Filed: Aug. 18, 2000

(86) PCT No.: PCT/FR00/02338

§ 371 (c)(1),
(2), (4) Date: May 15, 2002

(87) PCT Pub. No.: WO01/18095

PCT Pub. Date: Mar. 15, 2001

(30) Foreign Application Priority Data

Sep. 3, 1999 (FR) .............................................. 99 11091

(51) Int. Cl.$^7$ ............................... B01F 3/08; C08J 3/03
(52) U.S. Cl. ........................ 516/53; 516/76; 516/928; 516/929; 524/588
(58) Field of Search .......................... 516/53, 928, 929, 516/76; 524/588, 837

(56) References Cited

U.S. PATENT DOCUMENTS 4,668,717 A * 5/1987 Lemstra et al. .............. 523/322
5,133,897 A * 7/1992 Balzer ........................ 516/72
5,334,581 A * 8/1994 Behan et al. ................ 512/2
5,563,189 A * 10/1996 Hosokawa et al. .......... 516/53
5,763,505 A    6/1998 Derian ....................... 523/322

FOREIGN PATENT DOCUMENTS

| EP | 0 771 629 | 5/1997 | ............. B29B/7/00 |
| FR | 2 333 562 | 7/1977 | ............. B01F/3/08 |
| GB | 1 523 678 | * 9/1978 | |

OTHER PUBLICATIONS

Milton J. Rosen, Surfactans and Interfacial Phenomena (John Whiley & Sons, New York, NY, copyright 1978) pp. 96–99, May 1983.*
International Search Report, European Patent Office, Nov. 13, 2000.

* cited by examiner

Primary Examiner—Daniel S. Metzmaier

(57) ABSTRACT

The invention concerns a method for emulsifying, without grinding, a silicone in water in the presence of a surfactant, at a temperature less than 60° C. and under shearing at less than 100 s$^-$, comprising steps which consist in: a) preparing a primary oil-in-water emulsion including said surfactant and said silicone under shearing at less than 100 s$^-$, by adding an aqueous phase to an oily phase comprising said silicone; b) enriching the resulting emulsion with an enriching oily phase comprising said silicone by mixing, under shearing at less than 100 s$^-$, and c) if required, repeating one or several times the operation at step b) until the desired concentration in surfactant and/or silicone in the final emulsion is obtained and/or until the desired particle size distribution is obtained.

16 Claims, 2 Drawing Sheets

METHOD FOR EMULSIFYING HEAT-SENSITIVE SILICONES EMULSION WITHOUT GRINDING

Figure 1:
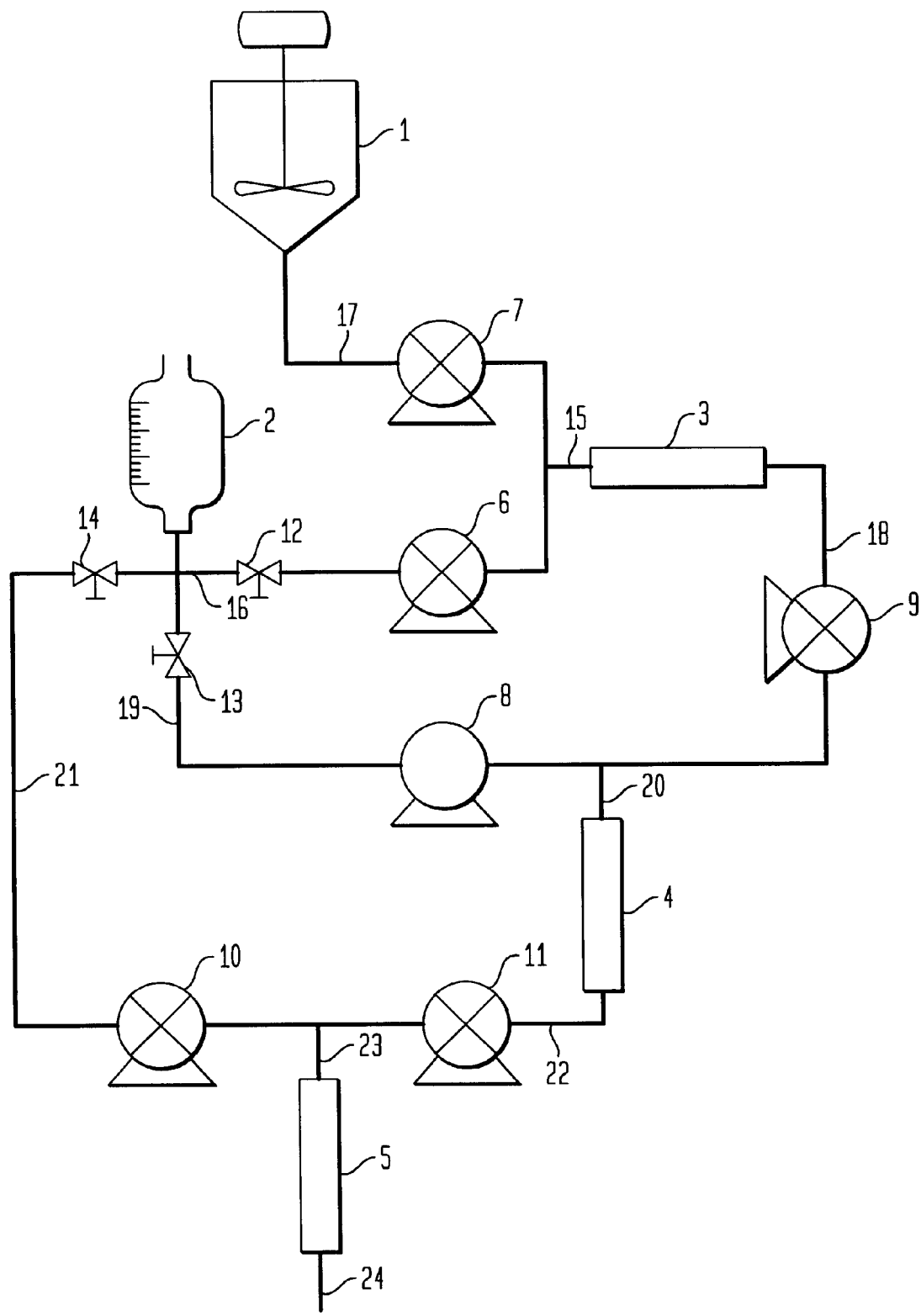

This application is an application under 35 U.S.C. Section 371 of International Application Number PCTJFR00/02338 filed on Aug. 18, 2000.

The present invention relates to a method of grindlessly emulsifying a silicone in water.

The emulsification methods most commonly used in the art are methods which involve mixing an aqueous phase and an oily phase with grinding, i.e., under high shear. High-shear conditions are generated, for example, by stirring in a colloidal grinder.

The major drawback of these methods is that they make it difficult if not impossible to produce heat-sensitive formulations in the form of emulsions.

The high shear involved in the methods of emulsification with grinding causes heating of the phases present and subjects their constituents to high temperatures. For example, when the oily phase comprises an organic solvent in addition to the silicone, the heating of the oily phase may cause the surfactant to dissolve in the oily phase, thereby promoting the formation of an inverse emulsion of water-in-oil type. In the context of the invention, however, the aim is to prepare direct emulsions of the oil-in-water type.

By heat-sensitive formulation is meant a formulation comprising one or more heat-sensitive constituents.

Within the context of the invention, a heat-sensitive constituent is a compound which is inherently temperature sensitive or is made temperature sensitive by its combination with other compounds that are present in the formulation.

Within the art, a distinction is made between direct emulsification methods and inverse emulsification methods. The direct emulsification methods for obtaining emulsions of oil-in-water type are methods in which, throughout its preparation and up until the time of its formation, the emulsion is a direct emulsion, i.e., an oil-in-water emulsion.

The inverse emulsification methods for obtaining emulsions of oil-in-water type involve the initial formation of a water-in-oil emulsion (commonly designated an inverse emulsion), then the inversion of this emulsion, whereby an oil-in-water emulsion is obtained.

The direct emulsification methods are not suitable for the industrial-scale preparation of emulsions with a high oil concentration.

In this case, in effect, the oily phase must be added slowly to the aqueous phase, this being undesirable from the standpoint of operating deadlines.

The inverse emulsification methods that are known in the art do not all lead to the preparation of fine, monodisperse emulsions.

The method of the invention aims to solve all of these problems by allowing the emulsification of viscous or slightly viscous oils in the presence where appropriate of one or more heat-sensitive constituents, with control of the particle size and of the polydispersity. The emulsions obtained by this method may have a very high oil concentration and may exhibit a very high weight ratio of oil to surfactant, of more than 9/1, for example.

More specifically, the method of the invention, which is a method of grindlessly emulsifying a silicone in water, comprises the steps of:

a) preparing a primary emulsion of oil-in-water type comprising said surfactant and said silicone under a shear of less than 100 s$^{-1}$ by adding an aqueous phase to an oily phase comprising said silicone, the proportion of oily phase in the primary emulsion being less than the maximum proportion $P_{max}$ above which addition of the aqueous phase to the oily phase does not make it possible to prepare an emulsion of oil-in-water type, and the weight ratio of surfactant to water in the primary emulsion being such that a mixture in this same ratio of the water and the surfactant leads to an organized phase to the exclusion of an inverse phase;

b) enriching the emulsion thus prepared with an oily enrichment phase comprising said silicone by mixing said emulsion with said oily enrichment phase under a shear of less than 100 s$^{-1}$, the amount of oily enrichment phase being less than the maximum amount above which addition of said emulsion to said oily phase does not make it possible to prepare an emulsion of oil-in-water type, thereby giving an emulsion of oil-in-water type; and c) where appropriate, repeating the implementation of step b) one or more times until the desired concentration of surfactant and/or silicone in the final emulsion is obtained and/or until the desired particle size is obtained.

The silicones which can be emulsified by the method of the invention are, for example, polyorganosiloxane oils, gums or resins.

Among the polyorganosiloxane oils and gums which can be employed, mention may be made of those consisting of units and formula:

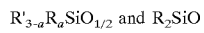

$R'_{3-a}R_aSiO_{1/2}$ and $R_2SiO$ in which formulae:

a is an integer from 0 to 3 the radicals R are identical or different and represent:
  a saturated or unsaturated aliphatic hydrocarbon group containing from 1 to 10 carbon atoms;
  an aromatic hydrocarbon group containing from 6 to 13 carbon atoms;
  a polar organic group bonded to the silicon by a Si—C or Si—O—C bond;
  a hydrogen atom:
    the radicals R' are identical or different and represent
  an OH group
  an alkoxy or alkenyloxy group containing from 1 to 10 carbon atoms;
  an aryloxy group containing from 6 to 13 carbon atoms;
  an acyloxy group containing from 2 to 13 carbon atoms;
  a ketiminoxy group containing from 3 to 8 carbon atoms;
  an amino- or amido-functional group containing from 1 to 6 carbon atoms and bonded to the silicon by a Si—N bond;

preferably at least 80% of the radicals R of said oils representing a methyl group.

Among the polyorganosiloxane resins which can be employed, mention may be made of those consisting of units of formulae:

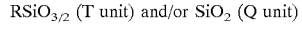

$RSiO_{3/2}$ (T unit) and/or $SiO_2$ (Q unit)

in association with units of formula:

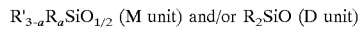

$R'_{3-a}R_aSiO_{1/2}$ (M unit) and/or $R_2SiO$ (D unit)

in which formulae a, R and R' are as defined above.

These resins are generally of the MQ, MDQ, TDM, TD or MT type.

As examples of aliphatic or aromatic hydrocarbon radicals R, mention may be made of the following groups:

alkyl, preferably optionally halogenated $C_1$–$C_{10}$ alkyl, such as methyl, ethyl, octyl or trifluoropropyl;

alkoxyalkylene, preferably $C_2$–$C_{10}$, more preferably $C_2$–$C_6$, such as —$CH_2$—$CH_2$—O—$CH_3$; —$CH_2$—$CH_2$—O—$CH_3$;

alkenyls, preferably $C_2$–$C_{10}$ alkenyl, such as vinyl, allyl, hexenyl, decenyl or decadienyl;

alkenyloxyalkylene such as —$(CH_2)_3$—O—$CH_2$—CH=$CH_2$, or alkenyloxyalkoxyalkyl such as —$(CH_2)_3$—$OCH_2$—$CH_2$—O—CH=$CH_2$, in which the alkyl moieties are preferably $C_1$–$C_{10}$ and the alkenyl moieties are preferably $C_2$–$C_{10}$;

aryls, preferably $C_6$–$C_{13}$, such as phenyl.

As examples of polar organic groups R, mention may be made of the following groups:

hydroxy-functional groups such as alkyl groups substituted by one or more hydroxyl or di(hydroxyalkyl) amino groups and optionally interrupted by one or more divalent hydroxyalkylamino groups. By alkyl is meant a preferably $C_1$–$C_{10}$, more preferably $C_1$–$C_6$, hydrocarbon chain;

examples of these groups are —$(CH_2)_3$—OH; —$(CH_2)_4N(CH_2CH_2OH)_2$; —$(CH_2)_3$—$N(CH_2CH_2OH)$—$CH_2$—$CH_2$—$N(CH_2CH_2OH)_2$:

amino-functional groups such as alkyl substituted by one or more amino or aminoalkylamino groups in which alkyl is as defined above; examples thereof are —$(CH_2)_3$—$NH_2$; $(CH_2)_3$—NH—$(CH_2)_2NH_2$;

amido-functional groups such as alkyl substituted by one or more acylamino groups and optionally interrupted by one or more divalent alkyl-CO—N< groups in which alkyl is as defined above and acyl represents alkylcarbonyl; one example is the group —$(CH_2)_3$—$N(COCH_3)$ —$(CH_2)_2NH(COCH_3)$;

carboxy-functional groups such as carboxyalkyl optionally interrupted by one or more oxygen or sulfur atoms, in which alkyl is as defined above; one example is the group —$CH_2$—$CH_2$—S—$CH_2$—COOH.

As examples of radicals R', mention may be made of the following groups:

alkoxy, preferably $C_1$—$C_{10}$, more preferably $C_1$–$C_6$, such as methoxy, ethoxy or octyloxy;

alkenyloxy, preferably $C_2$–$C_{10}$, more preferably $C_2$–$C_6$;

aryloxy, preferably $C_6$–$C_{13}$, such as phenyloxy;

acyloxy in which acyl is preferably ($C_1$–$C_{12}$) alkylcarbonyl such as acetoxy;

ketiminoxy containing from 3 to 8 carbon atoms, such as ON=$C(CH_3)C_2H_5$;

amino-functional groups such as alkyl or aryl substituted by amino, alkyl being preferably $C_1$–$C_6$ and aryl designating a cyclic aromatic hydrocarbon group which is preferably C6–$C_{13}$, such as phenyl; examples thereof are ethylamino and phenylamino;

amido-functional groups such as alkylcarbonylamino in which alkyl is preferably $C_1$–$C_6$; examples thereof are methylacetamido.

Specific examples of "D units" that may be mentioned include: $(CH_3)_2SiO$; $CH_3(CH=CH_2)SiO$; $CH_3(C_6H_5)SiO$; $(C_6H_5)_2SiO$; $CH_3HSiO$; $CH_3(CH_2$—$CH_2$—$CH_2OH)SiO$.

Specific examples of "M units" that may be mentioned include: $(CH_3)_3SiO_{1/2}$; $(CH_3)_2(OH)SiO_{1/2}$; $(CH_3)_2(CH=CH_2)SiO_{1/2}$; $(CH_3)_2HSiO_{1/2}$:$(OCH_3)_3SiO_{1/2}$:[O—C$(CH_3)$=$CH_2]_3SiO_{1/2}$:[ON=C $(CH_3)]_3SiO_{1/2}$; (NH—$CH_3$)$_3SiO_{1/2}$; (NH—CO—$CH_3$)$_3SiO_{1/2}$.

Specific examples of "T units" that may be mentioned include: $CH_3SiO_{3/2}$; $(CH=CH_2)SiO_{3/2}$; $HSiO_{3/2}$.

When said oils, gums or resins contain reactive and/or polar radicals R (such as H, OH, vinyl, allyl, hexenyl, aminoalkyls, etc), the latter generally represent not more than 2% of the weight of the oil or gum and not more than 10% of the weight of the resin.

The viscous polydimethylsiloxane and α,ω-bis(hydroxy) polydimethylsiloxane oils and also the polydimethylsiloxane, polyphenylmethylsiloxane and α,ω-bis(hydroxy)polydimethylsiloxane gums are well-known commercial products.

The viscous DT or MDT polymethylsiloxane resins containing from 1 to 5% by weight of silanol functions are also commercial products.

Preference is given more particularly to α,ω-bis(trimethyl)polydimethylsiloxane oils and gums; α,ω-bis(hydroxy)polydimethylsiloxane oils and gums; hydroxylated polydimethylsiloxane resins of type DT or MDT, and their mixtures in any proportions.

The silicones which can be emulsified by the method of the invention are very variable in viscosity. A distinction is made between those of high viscosity, whose viscosity is greater than 1 000 mPa·s, greater than 3 000 mPa·s for example, preferably greater than 5 000 mPa·s, and may attain values greater than 10 000 mPa·s and, for example, 500 000 mPa·s, and those of low viscosity whose viscosity is less than 1 000 mPa·s, and preferably between 1 and 1 000 mPa·s, for example between 20 and 1 000 mPa·s.

Within the context of the invention, the viscosity values are values of the dynamic viscosities measured at 25° C. using a Brookfield viscometer in accordance with the indications in the standard AFNOR NFT 76102.

Preferred examples of polydimethylsiloxane oils are those whose polydimethylsiloxane chain is blocked at its two ends by a $(CH_3)_3SiO_{1/2}$ or $(CH_3)_2 (OH)SiO_{1/2}$ group, of dynamic vicosity 20 mPa·s, 350 mPa·s, 750 mPa·s, 80 000 mPa·s or 135 000 mPa·s.

Preferred examples of polymethylsiloxane resins are:

a hydroxylated polymethylsiloxane resin of type MDT having 0.5% by weight of hydroxyl groups and consisting of 62% by weight of $CH_3SiO_{3/2}$ units, 24% by weight of $(CH_3)_2SiO_{1/2}$ units and 14% by weight of $(CH_3)_3SiO_{1/2}$ units; and a hydroxylated polymethylsiloxane resin of type DT having 2.2% by weight of hydroxyl groups and consisting of 69% by weight of $CH_3SiO_{3/2}$ units and 31% by weight of $(CH_3)_2SiO_{2/2}$ units.

When implementing each of steps a), b), and c) of the method of the invention, it is essential that the temperature remains less than 80° C., preferably less than 60° C., more preferably less than 35° C., for example, between 15 and 35° C.

An equally important parameter is the intensity of shearing. The emulsification proceeds via steps of mixing the various phases present. It is during these mixing steps that the shear must remain less than 100 $s^{-1}$. This essential characteristic distinguishes the method of the invention from a method with grinding.

So as to control the shear, the various phases are stirred in appropriate mixers such as mixtures with counterrotational stirring (for example, trimix from the Rayneri company), planetary mixers or mixtures with central stirring of the anchor or butterfly type.

The nature of the surfactant which can be used for emulsification is not critical according to the invention. It is therefore possible to use nonionic, cationic, anionic or even zwitterionic surfactants.

Examples of anionic surfactants include:

alkyl ester sulfonates of formula R—CH($SO_3$M)—COOR' in which R represents a $C_8$–$C_{20}$, preferably $C_{10}$–$C_{16}$, alkyl radical, R' a $C_1$–$C_6$, preferably $C_1$–$C_3$, alkyl radical, and M an alkali metal cation (sodium, potassium or lithium), a substituted or unsubstituted ammonium cation (methyl-, dimethyl-, trimethyl-, tetramethylammonium, dimethylpiperidinium, etc.) or a cation derived from an alkanolamine (monoethanolamine, diethanolamine, triethanolamine, etc.). Particular mention may be made of the methyl ester sulfonates whose radical R is $C_{14}$–$C_{16}$;

alkyl sulfates of formula ROSO$_3$M in which R represents a $C_{10}$–$C_{24}$, preferably $C_{12}$–$C_{20}$ and very particularly $C_{12}$–$C_{18}$, alkyl or hydroxyalkyl radical, M representing a hydrogen atom or a cation of the same definition as above, and their ethoxylated (EO) and/or propoxylenated (PO) derivatives, having on average from 0.5 to 6, preferably from 0.5 to 3, EO and/or PO units;

alkyl amide sulfates of formula RCONHR'OSO$_3$M in which R represents a $C_2$–$C_{22}$, preferably $C_6$–$C_{20}$, alkyl radical, R' a $C_2$–$C_3$ alkyl radical, M representing a hydrogen atom or a cation with the same definition as above, and their ethoxylated (EO) and/or propoxylenated (PO) derivatives, having on average from 0.5 to 60 EO and/or PO units;

salts of saturated or unsaturated $C_8$–$C_{24}$, preferably $C_{14}$–$C_{20}$, fatty acids, $C_9$–$C_{20}$ alkylbenzene-sulfonates, $C_8$–$C_{22}$ primary or secondary alkylsulfonates, alkylglycerol sulfonates, the sulfonated polycarboxylic acids described in GB-A-1 082 179, paraffin sulfonates, N-acyl-N-alkyltaurates, alkyl phosphates, alkylisethionates, alkylsuccinamates and alkylsulfosuccinates, sulfosuccinate monoesters or diesters, N-acylsarcosinates, alkylglycoside sulfates, polyethoxycarboxylates, the cation being an alkali metal (sodium, potassium or lithium), a substituted or unsubstituted ammonium residue (methyl-, dimethyl-, trimethyl-, tetramethylammonium, dimethylpiperidinium, etc.) or derived from an alkanolamine (monoethanol-amine, diethanolamine, triethanolamine, etc.); and phosphate or alkyl phosphate esters.

Examples of nonionic surfactants include:

polyoxyalkylenated (polyethoxyethylenated, polyoxypropylenated or polyoxybutylenated) alkylphenols whose alkyl substituent is $C_6$–$C_{12}$ and which contains from 5 to 25 oxyalkylenated units; by way of example, mention may be made of Triton X-45, X-114, X-100 or X-102, which are sold by Rohm & Haas Cy.;

glucosamines and glucamides;

glycerolamides derived from N-alkylamines (U.S. Pat. No. 5,223,179 and FR-A-1,585,966);

polyoxyalkylenated $C_8$–$C_{22}$ aliphatic alcohols containing from 1 to 25 oxyalkylene (oxyethylene, oxypropylene) units; by way of example, mention may be made of Tergitol 15-S-9 and Tergitol 24-L-6 NMW, sold by Union Carbide Corp., Neodol 45-9, Neodol 23-65, Neodol 45-7 and Neodol 45-4, sold by Shell Chemical Cy., and Kyro EOB sold by The Procter and Gamble Cy.

products resulting from the condensation of ethylene oxide with a hydrophobic compound resulting from the condensation of propylene oxide with propylene glycol, such as the Pluronics sold by BASF;

amine oxides such as ($C_{10}$–$C_{18}$ alkyl)dimethyl-amine oxides and ($C_8$–$C_{22}$ alkoxy)ethyldihydroxyethylamine oxides;

the alkyl polyglycosides described in U.S. Pat. No. 4. 565 647 and their polyoxyalkylenated derivatives;

$C_8$–$C_{20}$ fatty acid amides;

ethoxylated fatty acids; and ethoxylated amides, amines and amidoamines;

esters of polyoxyalkylenated or non-polyoxyalkylenated sorbitan with $C_8$–$C_{20}$ fatty acids, such as the oleates of polyoxyethylenated sorbitan (for example, SPAN and TWEEN);

esters of sucrose with $C_8$–$C_{20}$ fatty acids;

mixtures of esters of sucrose with $C_8$–$C_{20}$ fatty acids with $C_8$–$C_{20}$ fatty acid mono-, di- and/or triglycerides.

Examples of amphoteric and zwitterionic surfactants include:

those of the betaine type such as betaines, sulfobetaines, amidoalkylbetaines, sulfobetaines, alkylsultaines and alkyltrimethylsulfobetaines, condensation products of fatty acids and protein hydrolyzates, alkylamphopropionates or alkylamphodipropionates, amphoteric derivatives of alkylpolyamines such as Amphionic XL sold by Rhône-Poulenc, Ampholac 7T/X and Ampholac 7C/X sold by Berol Nobel, and cocoamphoacetates and cocoamphodiacetates.

The nonionic surfactants are nevertheless preferred and more particularly the nonionic surfactants of the polyoxyalkylenated linear- or branched-chain fatty alcohol type resulting from the condensation of a fatty alcohol with a $C_2$–$C_4$ alkylene oxide such as ethylene oxide, propylene oxide or butylene oxide. By way of example, mention may be made of ethoxylated isotridecyl alcohol.

More generally, preferred nonionic surfactants are those whose HLB is between 8 and 16, preferably between 10 and 15, more preferably between 12.5 and 15.

The term HLB (hydrophilic lipophilic balance) designates the ratio of the hydrophilicity of the polar groups of the surfactant molecules to the hydrophobicity of their lipophilic moiety. HLB values are reported in particular in various basic manuals such as the "Handbook des excipients pharmaceutiques, The Pharmaceutical Press, London, 1994)".

The method of the invention comprises at least steps a) and b), step a) consisting in preparing a direct primary emulsion of oil-in-water type including the silicone and the surfactant, this primary emulsion being enriched in step b) by an oily enrichment phase based on said silicone. It should be understood that, as a result of this enrichment step, the silicone concentration of the resulting emulsion increases whereas the surfactant concentration of the resulting emulsion is reduced.

The primary emulsion prepared by adding an aqueous phase to an oily phase is a direct emulsion. In accordance with the invention, a direct emulsion means any emulsion of oil-in-water type. Inverse emulsions denote any emulsion of water-in-oil type.

In accordance with the invention, the aqueous phase comprises essentially water but preferably also the surfactant used for the emulsification.

It will be noted that the method of the invention is not limited to the emulsification of one silicone but can be used for emulsifying a number of silicones, said silicone or silicones being optionally mixed with one or more organic oils which are different than silicones but compatible with them.

Within the context of the invention, the oily phase comprises one or more silicone compounds as defined above and, optionally, one or more constituents selected from a silane, a siliceous or nonsiliceous filler, a solvent and/or an additive which is compatible or compatibilized with silicones.

As additives mention may be made of anti-UV agents, antioxidants, dyes, antibacterials, fungicides, skin whiteners, vitamins, and perfumes.

Among the solvents of the silicone oils, gums or resins, optionally present in the oily phase, mention may be made of volatile cyclic polyorganosiloxanes (for example, octamethylcyclotetra-siloxane or decamethylcyclopentasiloxane), short polydimethylsiloxane oils (viscosity less than 100 mPa·s), hexamethyldisiloxane, ketones (for example, methyl ethyl ketone), ethers (for example diethyl ether), esters (for example, isopropyl myristate or ethyl acetate), certain chlorinated or chlorofluorinated solvents (for example, methylene, chloride or chloroform) and highly branched paraffins (for example, white oils based on isoalkanes and cycloalkanes).

The silanes may in particular be byproducts of the synthesis of said polyorganosiloxane oils, gums or resins which are employed or crosslinking agents of said oils, gums or resins.

They may be represented by the formula $(R_b)Si(OR')_{4-b}$, in which formula $b$ is an integer from 0 to 4, R and R' having the definition given above. They are described in particular in U.S. Pat. No. 3 294 725; U.S. Pat. No. 4 584 341; U.S. Pat. No. 4 618 642; U.S. Pat No. 4 608 412; U.S. Pat. No. 4 525 565; EP-A-340 120; EP-A-364 375; FR-A-1 248 826; FR-A-1 423 477; and EP-A-387 157.

As examples, mention may be made of the following silanes:

$Si(OC_2H_5)_4$; $CH_3Si(OCH_3)_3$; $CH_3Si(OC_2H_5)_3$; $(C_2H_5O)_3Si(OCH_3)$; $CH_2=CHSi(OCH_3)_3$; $CH_3(CH_2=CH)Si(OCH_3)_2$; $CH_2=CHSi(OC_2H_5)_3$; $CH_2=CHSi[ON=C(CH_3)C_2H_5]3$; $CH_3Si[ON=C(CH_3)_2]_3$; $CH_3Si[O—C(CH_3)=CH_2]_3$; methyltris (N-methylacetamidosilane); methyltris (cyclohexylaminosiloxane).

They are generally present in amounts of the order of from 0 to 10 parts by weight, preferably of the order of from 0 to 5 parts by weight, per 100 parts by weight of polyorganosiloxane oil(s) and/or gum(s) and/or resin, when they are reaction byproducts.

When it is their function as crosslinking agents of the hydroxylated oils, gums or resins which is desired, they are generally present in amounts of the order of from 0.5 to 30 parts by weight, preferably of the order of from 2 to 8 parts by weight, per 100 parts by weight of oil(s) and/or gum(s) and/or resin(s).

Said silanes can also be an additive which makes it possible to modify the physiocochemical properties, of adhesion in particular, of the silicone compositions of diverse applications which are obtained from the aqueous emulsions prepared by the method of the invention. Examples of such silanes are described in particular in EP-A-340 120. Among this category of silanes, mentioned may be made of aminopropyltriethoxy-silane, aminopropylmethyldiethoxysilane; and glycidoxypropyltrimethoxysilane. They are employed in quantities which can range up to 200%, generally of the order of from 2 to 100% of the weight of the oil(s) and/or gum(s) and/or resin(s).

In accordance with the invention, the semireinforcing: by way of example, mention may be made of colloidal silicas, pyrogenic and precipitated silica powders, diatomaceous earths, ground quartz, natural calcium carbonate, hydrated alumina, magnesium hydroxide, carbon black, titanium dioxide, aluminum oxide, vermiculite, zinc oxide, mica, talc, iron oxide, barium sulfate, slaked lime; the particle size of these fillers is generally of the order of from 0.001 to 300 μm; they are generally present in amounts which can range up to 300%, preferably of the order of from 3 to 100% of the weight of oil(s) and/or gum(s) and/or resin(s).

In accordance with the invention, the oily phase may further comprise the surfactant when the latter has not been added to the aqueous phase.

Accordingly, the surfactant required for the preparation of the primary emulsion is alternatively present in its entirety in the aqueous phase or present in its entirety in the oily phase or else distributed in any proportion between these two phases.

In yet another embodiment of the invention, the surfactant is added separately and in one go to the oily phase which is maintained at rest, at the same time as the aqueous phase.

In one preferred embodiment of the invention, the entirety of the surfactant is present within the aqueous phase before addition.

The addition of the aqueous phase to the oily phase can be carried out in any way whatsoever.

A first procedure consists in adding the aqueous phase to the oily phase, which is maintained with stirring, gradually or in small amounts, and, for example, dropwise, stirring being continued following addition until a direct emulsion is obtained by inversion.

As a variant, it is possible to add the aqueous phase, on the one hand, and, optionally, the surfactant, on the other hand (when the latter is not present in its entirety in the aqueous and oily phases) in one go to the oily phase at rest, and then to maintain the mixture with stirring until a direct emulsion is obtained.

To obtain a direct primary emulsion following addition it may be necessary to increase the intensity of stirring slightly, subject to the proviso that the shear generated must not exceed 100 s$^{-1}$. Obtaining a direct emulsion under these conditions is only possible, however, for well-defined respective proportions of surfactant, water, and organic oils.

The first condition to be observed concerns the relative proportion of water and surfactant which are present in the primary emulsion that is to be prepared. According to the invention, it is essential that the weight ratio of the water to the surfactant in the primary emulsion is such that a mixture of water and surfactant in this same ratio leads to an organized phase but not to an inverse phase. Examples of organized phases are the micellar phase, the lamellar phase, the hexagonal phase, and any mixture of two of these phases, such as a mixture of lamellar phase and micellar phase.

In accordance with the invention, it is preferred for the mixture of water and surfactant in said ratio to lead to a micellar phase, to a lamellar phase or to a mixture of these two phases.

When the silicone present in the primary emulsion is highly viscous, it is advantageous for the mixture of water and surfactant in said ratio to lead to a lamellar phase.

By "highly viscous" is meant more precisely a silicone with a viscosity of greater than 1 000 mPa·s, for example greater than 3000 mPa·s, preferably between 1 000 and 500 000 mPa·s, more preferably between 2 000 and 300 000 mPa·s.

When, conversely, the silicone to be emulsified has a low viscosity (less than 1 000 mPa·s, preferably between 1 and 1 000 mPa·s, and more preferably between 20 and 1 000 mPa·s), it is then desirable for the mixture of water and surfactant in said ratio to lead to a mixture of lamellar phase and micellar phase.

Accordingly, depending on the type of silicone used and on the nature of the surfactant, the skilled worker will easily be able to determine a range of variation of the water/surfactant ratio that is particularly favorable to the implementation of step a).

It should be understood that it is not necessary, for the implementation of this step, to form said organized phase beforehand before adding it to the oily phase, although this does correspond effectively to one preferred embodiment. In accordance with the invention, it is sufficient for the ratio of water to surfactant to be such that, were these two constituents to be mixed in this same ratio, they would form said organized phase.

It follows from this that the addition of an aqueous phase devoid of surfactant to the oily phase is another way of implementing step a), the surfactant being added simultaneously to the oily phase, or else being mixed beforehand with said oily phase.

Once the water/surfactant ratio is fixed, the skilled worker will readily determine the maximum proportion $P_{max}$ of oily phase which can be present in the emulsion. To do this it is sufficient to carry out a few preliminary tests on a laboratory scale.

One example of a test protocol is, for example, the following. It employs a mixer consisting of a frame paddle and a metal container (made, for example, of stainless steel), containing an isolating annular element (made, for example, of Teflon®), as a wall, which is arranged in the base of the container so as to allow the conductivity and hence the resistance of the solution present in the container to be measured.

Thus, when the container contains a conductive aqueous solution or an oil-in-water emulsion whose aqueous phase is conductive, the conductivity is sufficient to be measured. Conversely, when the container contains an oily phase or an oil-in-water-type emulsion, the conductivity is zero. In this way, it is easy to determine the maximum proportion of oil for which the formation of an oil-in-water emulsion is possible.

It is possible to envisage a number of methods of mixing the water, the surfactant, and the oily phase. However, the proportion $P_{max}$ depends on the chosen mixing method. Accordingly, for determining $P_{max}$, it is appropriate to use the same addition protocol as in step a) for the addition of the aqueous phase to the oily phase. Briefly, these mixing methods are as follows:

1)—The oily phase, devoid of surfactant, is poured into the container and an aqueous phase consisting of water and the surfactant is added slowly (dropwise or in portions) to said oily phase. At the beginning of the addition, the conductivity is zero. The point at which a nonzero conductivity is measured allows direct determination of $P_{max}$, $P_{max}$ representing the ratio of the amount of oily phase to the total weight of the emulsion. It is noted that the conductivity is nonzero at the point of inversion, i.e., at the point of transformation of the water-in-oil emulsion formed initially into an oil-in-water emulsion.

2)—This mixing method is similar to the preceding one except that the aqueous phase is added to the oily phase in one go.

3)—A third variant consists in proceeding as in 1) except that the oily phase poured into the mixing container contains all of the surfactant, the aqueous phase being composed exclusively of water.

4)—A fourth variant consists in proceeding as in 2) except that the oily phase poured into the mixing container contains all of the surfactant, the aqueous phase being composed exclusively of water.

It should be understood that, during these tests for determining $P_{max}$, the weight ratio of the amount of water to the amount of surfactant corresponds to that set for the implementation of step a) and indicated above and the shear is maintained below 100 s$^{-1}$, for example, by setting the rotational speed of the frame paddle at around 400 rpm.

It will be noted that, in the case of highly viscous oily phases, the proportion $P_{max}$ of oil which allows a direct oil-in-water emulsion to be obtained is greater than 80%, generally greater than 90%.

Conversely, in the case of low-viscosity oily phases, the proportion $P_{max}$ of oily phase is much lower, generally greater than 30% and, for example, greater than 40%.

For the implementation of step a), the proportion of oily phase in the primary emulsion must be less than or equal to $P_{max}$.

This proportion will be lower than the proportion of oily phase present in the final emulsion obtained at the end of the method (at the end of step b) or, where appropriate, at the end of step c)).

Generally, the primary emulsion prepared in step a) contains more than 15% by weight of oily phase, preferably more than 25% by weight, more preferably more than 30% by weight.

In one preferred embodiment, the organic phase is composed of one or more silicones.

The size of the droplets of oily phase that are dispersed in the continuous aqueous phase depends on numerous parameters and in particular on the type of organized phase that the water+ surfactant mixture makes up, on the viscosity of the oily phase and, to a lesser extent, on the chosen method of addition.

Generally, the droplets of dispersed phase have a volume-average diameter of less than 50 µm, for example less than 10 µm, most often less than 1 µm.

When the oily phase has a high viscosity, greater than 1 000 mPa·s (preferably greater than 2 000 mPa·s), the finest particle size is obtained for a water/surfactant ratio which defines a lamellar phase.

When the oily phase has a low viscosity, less than 1 000 mPa·s (for example between 1 and 1 000 mPa·s, more preferably between 20 and 1 000 mPa·s), the finest particle size is obtained for a water/surfactant ratio which defines a two-phase mixture of lamellar phase and micellar phase.

In step b), the primary emulsion is enriched with an oily enrichment phase.

In one preferred embodiment of the invention, the oily enrichment phase has the same composition as the oily phase used in step a) for the preparation of the direct primary emulsion.

Given that the oily phase of step a) is composed preferably of one or more silicones, the oily enrichment phase will also preferably be composed of said same silicones.

The amount of oily phase used in step b) for enriching the primary emulsion must not be so excessive that it makes it impossible to prepare a direct emulsion of oil-in-water type by mixing the primary emulsion with said oily enrichment phase.

As an indication, the amount of oily enrichment phase may represent from 25 to 100% of the amount of oily phase present in the direct emulsion to be enriched, preferably from 50 to 100%, more preferably from 75 to 100%.

The protocol for mixing the primary emulsion and the oily phase under a shear of less than 100 s$^{-1}$ is not critical according to the invention. Accordingly, it is possible either to add the oily phase to the emulsion (in one go or gradually) or to add the emulsion to the oily phase (in one go or gradually).

In one preferred embodiment of the invention, mixing proceeds via the formation of an inverse emulsion of water-in-oil type and its inversion, to give, finally, a direct emulsion of oil-in-water type. In order to do this, it is possible either to add the oily phase, maintained with stirring, gradually to the emulsion or else to add the oily phase in one go to the emulsion, maintained at rest, and then to stir the combined phases present under an appropriate shear, less than 100 s$^{-1}$.

Where mixing proceeds via an inversion of the emulsion, a finer particle size is obtained in the final emulsion (lower average droplet diameter).

The effect of the enrichment step is:

to enrich the primary emulsion in organic oil;

to reduce the surfactant concentration in the final emulsion;

to narrow the particle size distribution;

to reduce the average droplet diameter of the dispersed oily phase.

Step c) makes it possible to enrich the direct emulsion subsequently by implementing step b) one or more times.

Depending on the desired oil concentration, depending on the desired surfactant concentration and depending on the desired characteristics for the particle size distribution, the skilled worker will set the required number of enrichment steps.

The emulsions obtained by implementing the method of the invention are concentrated with oil, the weight ratio of the oil to the surfactant generally being greater than 9/1 .

In the case that the final emulsion, although presenting the characteristics desired for the particle size distribution, has too high a concentration of organic oil, it is possible to dilute the final emulsion by adding an aqueous dilution phase, the technique of addition of this aqueous phase being arbitrary. The particle size of the emulsion is not modified by this dilution step. In parallel, this dilution step makes it possible to reduce further the surfactant concentration.

Accordingly, in another of its aspects, the method of the invention further comprises a step of diluting the direct emulsion obtained, by adding an aqueous dilution phase.

The method of the invention is particularly advantageous in so far as it involves neither high shear nor elevated temperatures.

The heat-sensitive direct emulsions obtained by the method of the invention, comprising one or more heat-sensitive constituents, are novel and consequently form a further subject of the invention.

As examples of emulsions, mention may be made of those comprising:

a hydroxylated polymethylsiloxane resin of type MDT having 0.5% by weight of hydroxyl groups and consisting of 62% by weight of $CH_3SiO_{3/2}$ units, 24% by weight of $(CH_3)_2SiO_{1/2}$ units and 14% by weight of $(CH_3)_3SiO_{1/2}$ units; and a hydroxylated polymethylsiloxane resin of type DT having 2.2% by weight of hydroxyl groups and consisting of 69% by weight of $CH_3SiO_{3/2}$ units and 31% by weight of $(CH_3)_2SiO_{2/2}$ units.

The method of the invention may be implemented continuously.

In this case, the mixers used are, for example, static-type mixers and the various phases are added to one another by uniting them in a single pipe of convergent flows. One particularly advantageous procedure is to convey the various flows to a point of convergence through pipes of different diameters, such that:

in step a) the flow of aqueous phase is surrounded by the flow of oily phase at the point of convergence, and in step b) the flow of primary emulsion is surrounded by the flow of oily enrichment phase at the point of convergence.

FIG. 1 represents schematically the functional diagram of continuous implementation of a method of the invention comprising two enrichment steps.

Hereinbelow, the invention will be described by reference to FIGS. 1 to 3 and to the examples.

FIG. 1 represents very schematically a functional diagram for the continuous implementation of the method of the invention.

Figure 2:
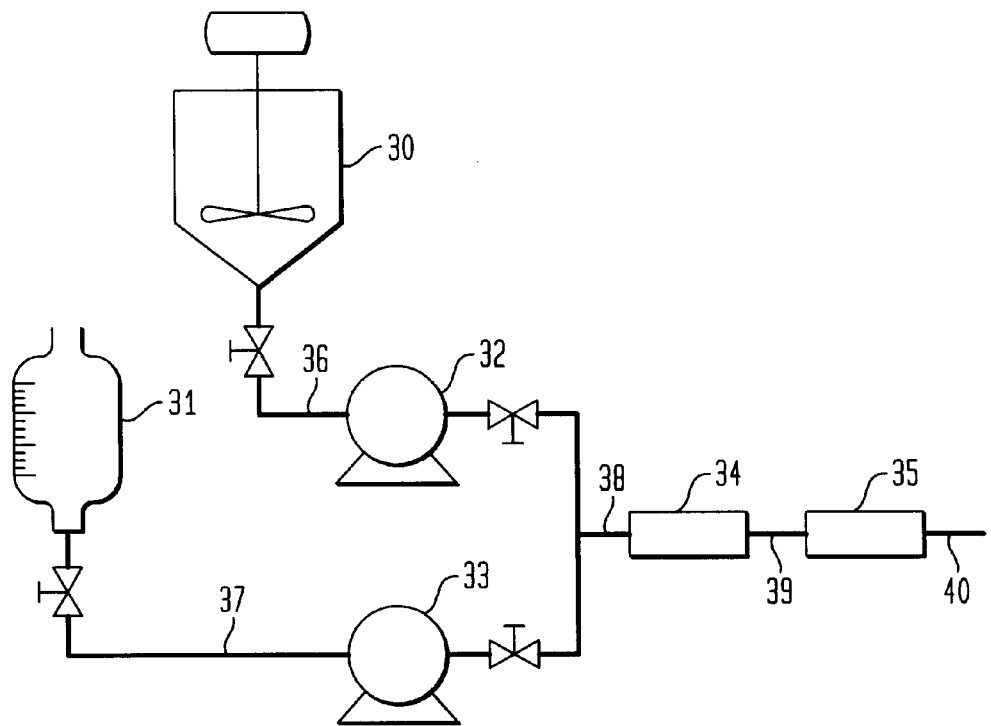

FIG. 2 schematically represents the plant, wherein following example 3 is implemented.

Figure 3:
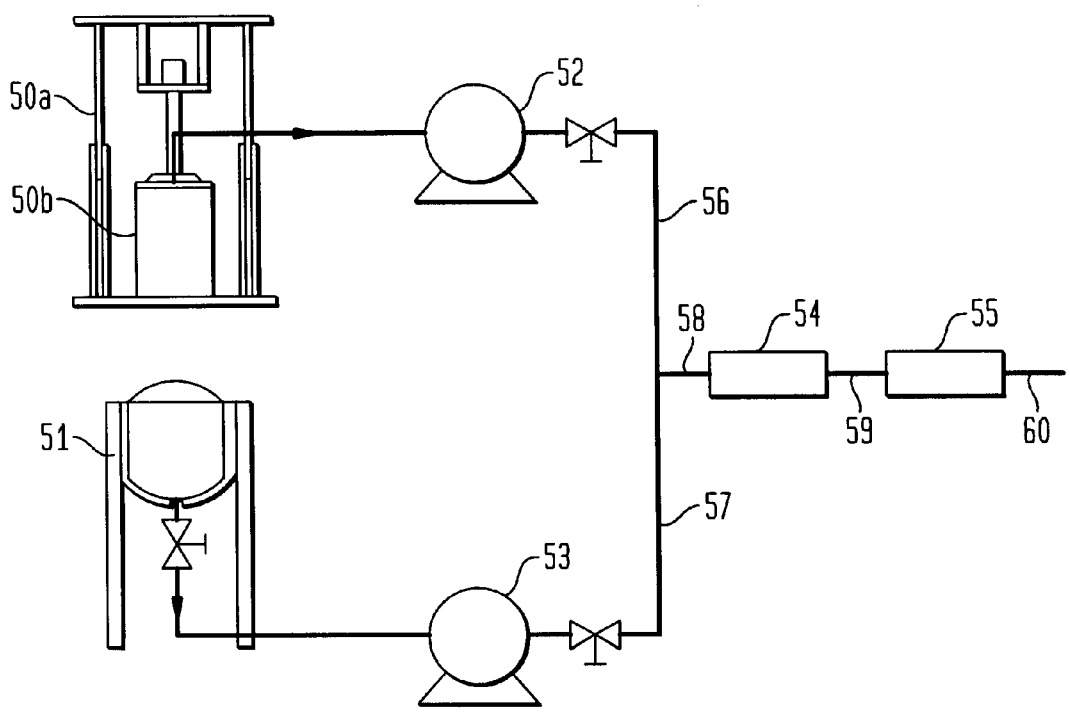

FIG. 3 schematically represents the plant, wherein following example 4 is implemented.

The plant illustrated in FIG. 1 comprises a tank 1 for storing the aqueous starting phase, comprising water and all of the surfactant, a delivery vessel 2 for storing the oily phase, three static mixers 3, 4 and 5, pumps 6, 7, 8, 9, 10 and 11, valves 12, 13 and 14, and pipes for circulating the various fluids.

In operation, the oil stored in the vessel 2 is conveyed by opening of the valve 12 via the pipe 16 under the action of the pump 6 to the pipe 15. At the same time, the aqueous phase stored in the tank 1 is conveyed via the pipe 17 under the action of the pump 7 to the pipe 15. The pipe 15 terminates at the static mixer 3. The emulsion exiting the mixer 3 is circulated via the pipe 18 under the action of the pump 9 to the pipe 20. At the same time, the oil stored in the vessel 2 is conveyed by opening of the valve 13 via the pipe 19 under the action of the pump 8 to the pipe 20. The pipe 20 opens into the static mixer 4. On exiting the mixer 4, the emulsion is conveyed via the pipe 22 under the action of the pump 11 to the pipe 23, which opens into the mixer 5. In parallel, the oil stored in the tank 2 is conveyed by opening of the valve 14 via the pipes 21 and 23 under the action of the pump 10 to the mixer 5.

The emulsion recovered at the outlet, by way of the pipe 24, has been enriched twice in oily phase.

The oil and/or gum and/or resin emulsions obtained by the method of the invention can be used for preparing silicone-based compositions which adhere to surfaces of diverse materials such as glass, concrete, and wood, for preparing cosmetic products (for example, shampoos, creams, conditioning agents, liquid soaps or other body hygiene products), industrial or household cleaning products, household descaling products, surface polishing products (for automobiles, for example), waxing products (for example, for shoes), and for the softening of textiles.

The invention is described below in the light of the following embodiment examples. In all of the examples the surfactant A represents an isotridecyl alcohol ethoxylated with eight moles of ethylene oxide per mole of isotridecyl alcohol.

EXAMPLE 1

The following experiment is carried out at approximately 23° C.

Step 1:

A 250 ml stainless steel cylindrical vessel with a diameter of 6.5 cm and a height of 10 cm, whose base is electrically insulated from the walls by a Teflon® insulator and is equipped with an eccentric frame paddle (3×5.4 cm), is charged with 3.47 g of distilled water and 4.42 g of a mixture of 15% water and 85% surfactant A, sold by the Hoechst company (a nonionic surfactant which is an isotridecyl alcohol ethoxylated with 8 moles of ethylene oxide per mole of iostridecyl alcohol)

The mixture is stirred slowly until homogeneous. Stirring is then stopped. 20 g of a polydimethylsiloxane oil blocked at each end with a $(CH_3)_3SiO_{1/2}$ unit and having a dynamic viscosity of 350 mPa·s at 25° C. as measured using a Brookfield viscometer in accordance with the indications of the standard AFNOR NFT 76102 are added to said mixture in one go.

The mixture is maintained with stirring (200 rpm) until an oil-in-water emulsion is obtained, more specifically for less than one minute.

The point at which the oil-in-water emulsion is obtained (inversion point) is determined by conductimetry and more specifically by measuring the resistance of the emulsion. Stirring is continued for 5 minutes.

The emulsion is observed under the microscope in order to verify its appearance, homogeneity and particle size. The particle size distribution is determined using a laser granulometer.

The characteristics of the particle size distribution are as follows. standard deviation:0.3$\mu$m median diameter:1.1 $\mu$m, the median diameter being such that 50% of the particles by volume have a diameter less than or equal to this median diameter.

The emulsion obtained contains 71.7% by weight of oil.

Step 2:

Optionally, distilled water is added to the emulsion present in the vessel in order to maintain the water/surfactant ratio of 44/56.

Following homogenization of the medium with gentle stirring, stirring is stopped and 20 g of the oil used in step 1 are added to the emulsion in one go.

The mixture is maintained with stirring (200 rpm) for 5 minutes. The inversion is obtained after the first minute of stirring.

The emulsion obtained at the end of this second step contains 84.5% by weight of oil.

Its particle size distribution is characterized by:

a standard deviation of 0.2 $\mu$m a median diameter of 1 $\mu$m.

Steps 3 and 4

The procedure of step 2 is carried out twice in succession. The characteristics of the emulsion obtained at the end of each of steps 3 and 4 are reported in table 1 below.

TABLE 1

| Step No. | Oil content (% by weight) | Standard deviation | Median diameter ($\mu$m) |
| --- | --- | --- | --- |
| Step 3 | 88.3 | 0.13 | 0.6 |
| Step 4 | 91.0 | 0.12 | 0.5 |

Step 5

In this last step, 45.3 g of distilled water are introduced slowly with stirring (200 rpm).

Stirring is continued for five minutes.

The final emulsion contains 60% by weight of oil.

The particle size distribution of this oil is identical to the preceding one.

EXAMPLE 2

The procedure is exactly as in the preceding example 1 except that:

the initial charge to the vessel consists of 10.43 g of distilled water and 13.27 g of the mixture of 15% water and 85% surfactant A, giving a water/surfactant ratio of 44/56;

the silicone used is a polydimethylsiloxane oil whose polydimethylsiloxane chain is blocked at each end with a $(CH_3)_3SiO_{1/2}$ unit and which has a viscosity of 20 mPa·s at 25° C. as measured using a Brookfield viscometer according to the indications of the standard AFNOR NFT 76102;

the process comprises eight additional steps (steps 5 to 12) in the course of which the procedure is exactly the same as in step 2 by addition of 20 g of oil; after step 4, the emulsion is transferred to a 11 reactor;

in step 13, the procedure is as in step 5 of example 1 above, diluting the emulsion by adding 91.6 g of distilled water.

The changes in the emulsion and its particle size distribution are followed in table 2 below:

TABLE 2

| Step No. | Oil content (% by weight) | Standard deviation | Median diameter ($\mu$m) |
| --- | --- | --- | --- |
| Step 1 | 45.7 | 0.3 | 1.2 |
| Step 2 | 62.7 | 0.2 | 0.8 |
| Step 12 | 91 | 0.12 | 0.5 |
| Step 13 of dilution with water | 66.5 | 0.12 | 0.5 |

Examples 1 and 2 show clearly that the method of the invention makes it possible to reduce the polydispersity of the final emulsion while allowing the preparation of a finer emulsion (smaller diameter of the droplets of dispersed phase).

EXAMPLE 3

This embodiment example was implemented using the plant of FIG. 2.

This plant comprises a storage tank 30, a delivery vessel 31, two volumetric, magnetic-drive gear pumps 32 and 33 and two static mixers 34 and 35 of type Sulzer SMX DN 12 and DN 4, and pipes for circulating the various fluids.

Step 1

The tank 30 is initially charged with 44% of water and 56% of a mixture of 15% water and 85% surfactant A.

The delivery vessel 31 is charged with the same polydimethylsiloxane oil as that used in example 1.

The oil is guided via the pipe 37 and by means of the pump 33 to the pipe 38, into which it is introduced via an injection nozzle (not shown) with a flow rate of 1.7 kg/hour.

At the same time, the aqueous phase consisting of water and surfactant is guided via the pipe 36 and by means of the pump 32 to the pipe 38. The rate at which the aqueous phase is introduced into the pipe 38 is 1.65 kg/h.

The total liquid flow rate is 3.35 kg/h into the pipe 38.

The pipe 38 opens out into the mixer 34. The mixer 34 is connected to a downstream mixer 35 by means of the pipe 39.

At the outlet of the mixer 35, an oil-in-water emulsion containing 50% by weight of oil is recovered by way of the pipe 40.

The particle size distribution of this emulsion is analyzed as in example 1.

Its characteristics are as follows:
Sauter diameter:2.88 μm
Median diameter:3.04 μm,
D(0.9)–D(0.1):4.73 μm,
the Sauter diameter D (3.2) expressed in μm being given by the following equation:

$$D(3.2) = \frac{6}{v_{sp}}$$

in which $v_{sp}$ represents the specific surface expressed in $m^2/m^3$, namely the sum of the surfaces of the droplets of dispersed phase which are present in 1 $m^3$ of emulsion;

D(0.9) being such that 90% of the particles by volume have a diameter less than or equal to the diameter D(0.9);

D(0.1) being such that 10% of the particles y volume have a diameter less than or equal to the diameter D(0.1).

The difference D(0.9)–D(0.) is a measure of the polydispersity of the emulsion. The greater this difference, the higher the polydispersity.

Step 2:

The tank 30, emptied of the aqueous phase that it contained in the preceding step, is charged with the emulsion withdrawn from the pipe 40 in the preceding step.

The emulsion is then introduced from the tank 30 via the pipe 36 into the pipe 38, with a flow rate of 2 kg/h.

At the same time, the oil is introduced into the pipe 38 with a flow rate of 2 kg/h by means of an injection nozzle (not shown), on exiting the pipe 37.

The total flow rate into the pipe 38 is 4 kg/h. At the outlet of the mixer 35 an emulsion containing 75% by weight of oil is recovered by way of the pipe 40.

The particle size distribution of this emulsion has the following characteristics:
Sauter diameter:1.42 μm
Median diameter:1.81 μm,
D(0.9)–D(0.1):4.31 μm.

Step. 3

The procedure is exactly as in step 2. Th emulsion resulting from step 2 is introduced from the tank 30 into the pipe 38 with a flow rate of 1.64 kg/h.

The oil is introduced from the delivery vessel 31 into the pipe 38 with a flow rate of 2 kg/h.

The total flow rate into the pipe 38 is 3.64 kg/h.

The emulsion recovered by way of the pipe 40 contains 88% by weight of oil. The particle size distribution of this emulsion has the following characteristics:
Sauter diameter:0.8 μm
Median diameter:0.95 μm,
D(0.9)–D(0.1):5.9 μm.

This emulsion is made finer by reintroducing it into the mixers 34 and 35 with the manual piston of the main line pump, with a flow rate of 4 kg/h.

The resulting final emulsion has the following characteristics:

Oil concentration: 91% by weight
Characteristics of the particle size distribution:
Sauter diameter:0.49 μm
Median diameter:0.58 μm,
D(0.9)–D(0.1):2.22 μm.

EXAMPLE 4

This example is implemented in the plant shown schematically in FIG. 3. Said plant comprises:

a cask-press plate of make Rexon type 80031A, 50a, allowing the pipe 56 to be fed first with water + surfactant mixture and then with emulsion thereafter, stored in succession in the reactor 50b;

a stainless steel reactor 51, without stirring, containing polydimethylsiloxane oil whose polydimethylsiloxane chain is blocked at each end by a $(CH_3)_2(OH)SiO_{1/2}$ unit and which has a dynamic viscosity of 135 000 mPa·s at 25° C. as measured using a Brookfield viscometer in accordance with the indications in the standard AFNOR NFT 76102; this reactor is able to withstand a pressure of 3 bar. This property allows the pump 53 sited downstream of the reactor 51 on the pipe 57 to be primed;

a volumetric gear pump of make MAAG type TX22, 52, making it possible to ensure a constant flow rate in the pipe 56 despite the pulsed flow delivered at the entry of said gear pump, the cask-press plate being equipped with a piston pump; the maximum delivery pressure of the pump 52 is 20 bar;

a second volumetric gear pump 53 of make MAAG type 22/13 giving a maximum delivery pressure of 16 bar:

an injection nozzle, not shown, which allows the oil to be introduced into the pipe 58 at the exit from the pipe 57;

two static mixers mounted in series, 54 and 55, and connected by the pipe 59, of type Sulzer SMX DN50 and DN25.

Step 1

44% of water and 56% of a mixture of 15% water and 85% surfactant A are premixed in the reactor 50b and then introduced at a flow rate of 10 kg/h into the line 58 via the pipe 56, by means of the pump 52 and the cask-press plate 50a.

In parallel, the silicone oil is introduced into the pipe 58 at a flow rate of 14 kg/h from the reactor 51 via the pipe 57, by means of an injection nozzle (not shown) and by way of the pump 53.

The total flow rate into the pipe 58 is 24 kg/h.

The pipe 58 opens out into the mixer 54, which is connected to the mixer 55 via the pipe 59. From the mixer 55, an oil-in-water emulsion containing 59% by weight of silicone oil is recovered by way of the pipe 60.

The particle size distribution of this emulsion is characterized as in example 3. Its characteristics are as follows:
Sauter diameter:0.41 μm
Median diameter:0.48 μm,
D(0.9)–D(0.1):2.53 μr.

Step 2

The emulsion recovered upon exiting the pipe 60 is charged to the reactor 50b.

This emulsion is introduced into the pipe 58 with a flow rate of 15 kg/h from the reactor via the pipe 56 by means of the pump 52. At the same time, the silicone oil from the reactor 51 is introduced into the pipe 58, with a flow rate of 15 kg/h.

The total flow rate of liquid into the pipe 58 is 30 kg/h.

At the outlet of the mixer 55 by way of the pipe 60 an emulsion of oil-in-water type is recovered which contains 79% by weight of silicone oil and whose particle size distribution has the following characteristics:

Sauter diameter:0.47 μm

Median diameter:0.99 μm,

D(0.9)–D(0.1):8.33 μm.

This emulsion is then made finer as follows. It is first charged to the reactor 50b and then reintroduced on its own into the pipe 58 with a flow rate of 30 l/h in order to reduce the dispersity. The resulting emulsion contains 79% by weight of silicone oil and differs essentially from the preceding emulsion by the characteristics of its particle size distribution.

Sauter diameter:0.43 μm

Median diameter:0.66 μm,

D(0.9)–D(0.1):1.54 μm.

Step 3

This step is operated in the same way as in step 2, except that:

the rate at which the emulsion is introduced into the pipe 58 is 10 kg/h;

the rate at which the silicone oil is introduced into the pipe 58 is 10 kg/h;

the total flow rate of liquid into the pipe 58 is 20 kg/h;

the emulsion obtained at the outlet of the mixer 55 in the pipe 60 has not been made finer.

This emulsion has the following characteristics:

it contains 90% by weight of silicone oil;

its particle size distribution is as follows:

Sauter diameter:0.47 μm

Median diameter:0.79 μm,

D(0.9)–D(01.):1.8 μm.

EXAMPLE 5

Step 1

A 30 l tank equipped with a planetary-type stirrer and cooled by circulation of water at 15° C. within the jacket is charged with 1.5 kg of a mixture of 15% water and 85% surfactant A and 1.2 kg of water. The mixture is maintained with stirring for 5 minutes (50 rpm) and then stirring is stopped. At this point 0.825 kg of a polydimethylsiloxane oil identical to that used in example 1 is introduced in one go and the mixture is maintained with stirring (50 rpm) for 5 minutes, ensuring that the temperature does not exceed 25° C.

Step 2.

Stirring is stopped and a further batch of 6.825 kg of the preceding oil used in step 1 is introduced in one go. After it has been introduced, the mixture is maintained with stirring (50 rpm) for 5 minutes. During this operation, the temperature is kept below 25° C.

Steps 3 and 4

The procedure is exactly the same as in the preceding step 2 (stopping stirring, rapid introduction of oil, and restarting stirring).

The characteristics of the emulsion obtained at the end of each step are collated in table 3 below.

TABLE 3

| Step No. | Silicone oil content (% by weight) | Sauter diameter (μm) | Median diameter (μm) | D(0.9)–D(0.1) (μm) |
|---|---|---|---|---|
| 1 | 71% | 0.97 | 1.21 | 1.31 |
| 2 | 83% | 0.66 | 0.74 | 0.79 |
| 3 | 88% | 0.55 | 0.65 | 0.73 |
| 4 | 91% | 0.4 | 0.48 | 0.73 |

COMPARATIVE EXAMPLE

The procedure of example 4 is repeated except that:

the plant of FIG. 3 additionally comprises a surfactant A storage container, a volumetric pump for circulating the mixture of 15% water and 85% surfactant A to the pipe 58; and a pipe which allows the mixture of 15% water and 85% surfactant A to be conveyed to said pipe 58;

the plant of FIG. 3 is modified, the mixers 54 and 55 being replaced by three mixers arranged in series, namely a Kenics-type mixer consisting of 9 Kenics DN35 elements, a Sulzer-type mixer consisting of 12 Sulzer SMX DN50 elements, and a Sulzer SMX DN25-type mixer.

The water, the surfactant, and the polydimethylsiloxane oil, which is identical to that in example 4, are conveyed to the pipe 58 by way of separate pipes. The oil is introduced at the entry of the pipe 58 with a flow rate of 24 kg/h. The total flow rate into this pipe is 27 kg/h, the proportion of surfactant A in the aqueous phase being 62%.

The emulsion recovered at the outlet of the mixers via the pipe 60 is an oil-in-water emulsion containing 89% of oil.

The characteristics of the particle size distribution are as follows:

Sauter diameter:2.81 μm.

D(0.9)–D(0.1):2.89 μm.

What is claimed is:

1. A method of grindlessly emulsifying a silicone in water, in the presence of a surfactant, at a temperature of less than 60° C. and under a shear of less than 100 s$^{-1}$, comprising the steps of:

a) preparing a primary emulsion of oil-in-water type comprising said surfactant and said silicone, under a shear of less than 100 s$^{-1}$, by adding an aqueous phase to an oily phase comprising said silicone, with a proportion of oily phase in the primary emulsion being less than a maximum proportion $P_{max}$ above which addition of the aqueous phase to the oily phase does not make it possible to prepare an emulsion of oil-in-water type, and with a weight ratio of surfactant to water in the primary emulsion being such that a mixture of the water and the surfactant in this same ratio leads to an organized phase different from an inverse phase, b) enriching the primary emulsion thus prepared with an oily enrichment phase comprising the silicone, to obtain an emulsion of oil-in-water type, by mixing said primary emulsion with said oily enrichment phase under a shear of less than 100 s$^{-1}$, the amount of oily enrichment phase being of less than the maximum amount above which adding said emulsion to said oily phase does not make it possible to prepare an emulsion of oil-in-water type, and c) optionally, repeating step b) once or several times, until a desired concentration of surfactant or silicone in the final emulsion is obtained, or until a desired particle size is obtained.

2. The method according to claim 1, being carried out at a temperature of less than 35° C.

3. The method according to claim 2, wherein the temperature is of between 15 and 35° C.

4. The method according to claim 1, wherein in step a) the surfactant is comprised in the aqueous phase.

5. The method according to claim 4, wherein step a) comprises the steps of adding the aqueous phase to the oily phase once only, without shear, and then implementing shearing, until the primary emulsion of oil-in-water type is obtained.

6. The method according to claim 1, wherein the oily enrichment phase in step b) has the same composition as the oily phase of step a).

7. The method according to claim 1, wherein the oily phase used in step a) comprises one or more silicones.

8. The method according to claim 1, wherein the primary emulsion comprises more than 15% by weight of the oily phase.

9. The method according to claim 8, wherein the primary emulsion comprises more than 30% by weight of the oily phase.

10. The method according to claim 1, wherein in that in step b) the amount of oily enrichment phase represents from 25 to 100% of the amount of oily phase present in the primary emulsion.

11. The method according to claim 10, wherein the amount of oily enrichment phase represents from 75 to 100% of the amount of oily phase present in the primary emulsion.

12. The method according to claim 1, wherein step b) comprises the steps of adding the oily enrichment phase to the emulsion once only, without shear, and then implementing shearing until the emulsion of oil-in-water type is obtained.

13. The method according to claim 1, further comprising the step of diluting the emulsion obtained by adding an aqueous dilution phase.

14. The method according to claim 1, being carried out continuously.

15. The method according to claim 1, wherein the silicone is selected from the group consisting of α,ω-bis(trimethyl)polydimethylsiloxane oils, α,ω-bis(trimethyl)polydimethylsiloxane gums, α,ω-bis(hydroxy)polydimethylsiloxane oils, α,ω-bis(hydroxy)polydimethylsiloxane gums, hydroxylated polydimethylsiloxane resin of type DT, hydroxylated polydimethylsiloxane resins of type MDT, and mixtures thereof.

16. The method according to claim 1, wherein said emulsifying of the silicone is carried out in the presence of one or more heat-sensitive constituents.

* * * * *